(12) United States Patent
Matsumoto et al.

(10) Patent No.: US 9,794,853 B2
(45) Date of Patent: *Oct. 17, 2017

(54) WIRELESS COMMUNICATION DEVICE, WIRELESS COMMUNICATION METHOD, WIRELESS COMMUNICATION DEVICE CONTROL PROGRAM, AND WIRELESS COMMUNICATION SYSTEM

(71) Applicant: SEIKO EPSON CORPORATION, Tokyo (JP)

(72) Inventors: Hlroshi Matsumoto, Nagano (JP);
Yutaka Akahori, Yamagata-mura (JP);
Hirofumi Miyamoto, Nagano (JP);
Norihiko Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,623

(22) Filed: Dec. 2, 2016

(65) Prior Publication Data

US 2017/0086122 A1    Mar. 23, 2017

Related U.S. Application Data

(63) Continuation of application No. 14/203,793, filed on Mar. 11, 2014, now Pat. No. 9,544,712.

(30) Foreign Application Priority Data

Mar. 29, 2013  (JP) ................................. 2013-071617

(51) Int. Cl.
*H04B 5/00* (2006.01)
*H04B 7/00* (2006.01)
(Continued)

(52) U.S. Cl.
CPC ........ *H04W 40/02* (2013.01); *H04N 1/00106* (2013.01); *H04N 1/00315* (2013.01);
(Continued)

(58) Field of Classification Search
CPC ..... H04W 4/008; H04W 40/02; H04W 40/22; H04W 48/18; H04W 76/00; H04W 76/02;
(Continued)

(56) References Cited

U.S. PATENT DOCUMENTS 6,618,750 B1   9/2003  Staats
8,001,267 B2   8/2011  Cors et al.
(Continued)

FOREIGN PATENT DOCUMENTS

JP    2004-180225 A    6/2004
JP    2009-135865 A    6/2009
JP    2010-213334 A    9/2010

*Primary Examiner* — Quochien B Vuong
(74) *Attorney, Agent, or Firm* — Global IP Counsellors, LLP

(57) ABSTRACT

A wireless communication device performs a communication with a communication device wirelessly. The wireless communication device comprises a communication information acquisition unit, a selection unit, and a communication unit. The communication information acquisition unit acquires a communication information from the communication device using a short distance wireless communication, the communication information indicating a plurality of communication paths available to the communication device and other than the short distance wireless communication. The selection unit selects one of a plurality of communication paths other than the short distance wireless communication based on the communication information. The communication unit performs a communication with the communication device in the selected one of the plurality of communication paths. The selection unit selects one communication path available to both the wireless communica- (Continued)

tion device and the communication device according to a predetermined information indicative of priority criteria for selecting a communication path.

7 Claims, 4 Drawing Sheets

(51) Int. Cl.
H04W 40/00 (2009.01)
H04W 40/02 (2009.01)
H04W 4/00 (2009.01)
H04N 1/00 (2006.01)
H04W 84/12 (2009.01)

(52) U.S. Cl.
CPC .... *H04W 4/008* (2013.01); *H04N 2201/0094* (2013.01); *H04W 84/12* (2013.01)

(58) Field of Classification Search
CPC ............. H04W 76/023; H04W 76/025; H04W 76/043; H04W 84/12; H04W 88/04; H04W 88/06
USPC ...... 455/41.1, 41.2, 41.3, 445, 552.1, 553.1; 370/351, 352; 709/238, 239, 240
See application file for complete search history.

(56) References Cited

U.S. PATENT DOCUMENTS

| 8,406,253 | B2 | 3/2013 | Kato et al. |
| 8,570,577 | B2 | 10/2013 | Ohara |
| 8,649,332 | B2 | 2/2014 | Ra et al. |
| 9,014,089 | B2 | 4/2015 | Miyagawa et al. |
| 2007/0066315 | A1 | 3/2007 | Kado |
| 2009/0052348 | A1 | 2/2009 | Kato et al. |

|  | PATTERN A | PATTERN B | PATTERN C | PATTERN D |
|---|---|---|---|---|
| AVAILABLE PATH | r2<br>(BT)<br>(DIRECT) | r3, r4<br>(Wi-Fi)<br>(VIA AP) | r3, r5, r4<br>(Wi-Fi)<br>(VIA AP, SERVER) | r6, r5, r4<br>(3G, Wi-Fi)<br>(VIA SERVER, AP) |
| IN THE ORDER OF LOWER COMMUNICATION EXPENSE | 1 | 1 | 2 | 3 |
| IN THE ORDER OF EASINESS OF SERVICE ADDITION | 2 | 2 | 1 | 1 |
| IN THE ORDER OF SHORTER PROCESSING TIME RELATED TO COMMUNICATION | 2 | 1 | 3 | 4 |
| SELECTION CONDITION | COMMUNICATION EXPENSE PRIORITY | | SERVICE PRIORITY | |

Fig. 4

WIRELESS COMMUNICATION DEVICE, WIRELESS COMMUNICATION METHOD, WIRELESS COMMUNICATION DEVICE CONTROL PROGRAM, AND WIRELESS COMMUNICATION SYSTEM

CROSS-REFERENCE TO RELATED APPLICATIONS

This application is a continuation application of U.S. patent application Ser. No. 14/203,793 filed on Mar. 11, 2014, which claims priority to Japanese Patent Application No. 2013-071617 filed on Mar. 29, 2013. The entire disclosures of U.S. patent application Ser. No. 14/203,793 and Japanese Patent Application No. 2013-071617 are hereby incorporated herein by reference.

BACKGROUND

Technical Field

The present invention relates to a wireless communication device, a wireless communication method, a wireless communication device control program, and a wireless communication system, and specifically, it relates to a selection method of a communication path.

Background Technology

Various methods for facilitating an initial setting of a wireless communication between two devices each other have been proposed. In Patent Document 1, it discloses a technology that by the first communication means such as the Near Field Communication (NFC), a setting information for communicating in the second communication means such as Bluetooth®, which is different from the first communication means, is acquired between a mobile terminal device and an information processing device so that it is easy to establish the communication in the second communication means.

Japanese Laid-open Patent Publication No. 2009-135865 (Patent Document 1) is an example of the related art.

SUMMARY

Problems to Be Solved by the Invention

However, in Patent Document 1, it is not particularly mentioned what happens when there are a plurality of second communication means, or when a communication path is different even though the same communication means is used. An advantage of the invention is to perform a communication by selecting an appropriate communication path when there are a plurality of communication paths between two wireless communication devices.
Means Used to Solve the Above-Mentioned Problems A wireless communication device performs a communication with a communication device wirelessly. The wireless communication device comprises a communication information acquisition unit, a selection unit, and a communication unit. The communication information acquisition unit acquires a communication information from the communication device using a short distance wireless communication, the communication information indicating a plurality of communication paths available to the communication device and other than the short distance wireless communication. The selection unit selects one of a plurality of communication paths other than the short distance wireless communication based on the communication information. The communication unit performs a communication with the communication device in the selected one of the plurality of communication paths. The selection unit selects one communication path available to both the wireless communication device and the communication device according to a predetermined information indicative of priority criteria for selecting a communication path.

BRIEF DESCRIPTION OF THE DRAWINGS

Referring now to the attached drawings which form a part of this original disclosure:

FIG. 4 is a diagram showing a communication path and its features according to the embodiment of the invention.

DETAILED DESCRIPTION OF EXEMPLARY EMBODIMENTS

Hereinafter, the embodiments of the invention will be described in reference to the attached drawings in the following order.

1. First Embodiment 1-1. Configuration

Figure 1:
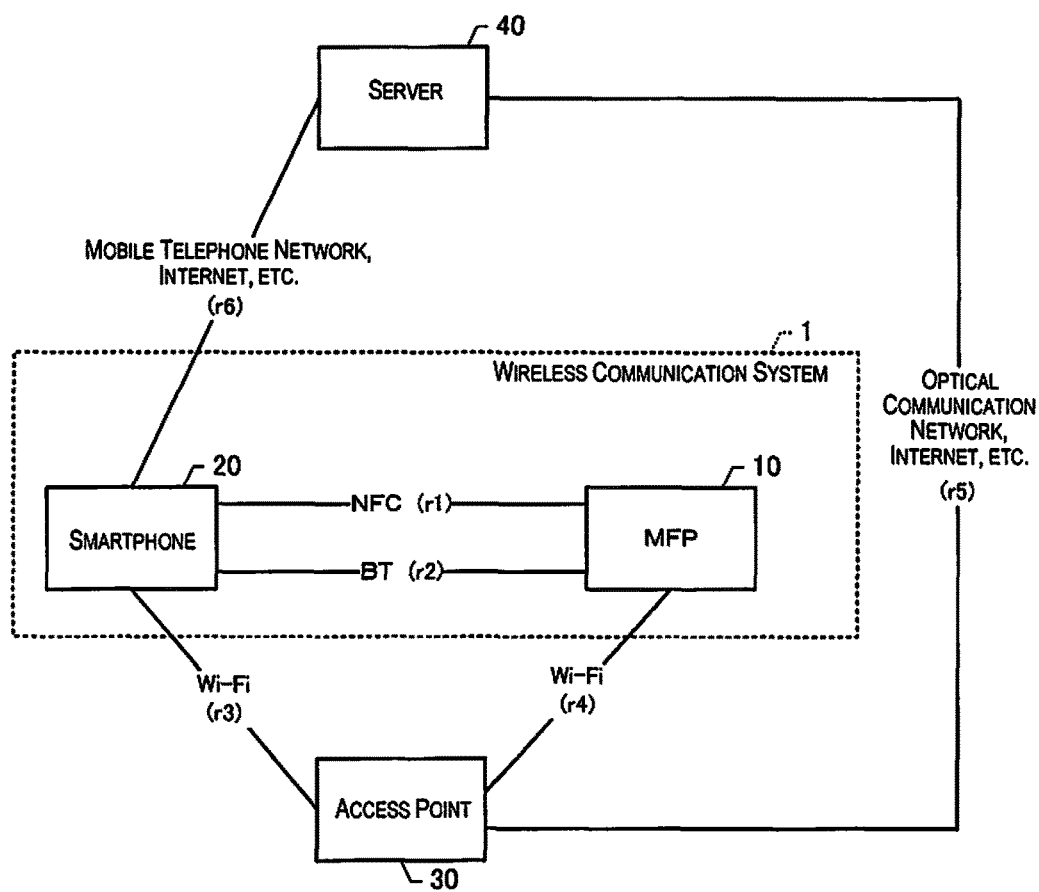
FIG. 1 is a diagram showing a wireless communication system according to an embodiment of the invention.

FIG. 1 is a pattern diagram showing a wireless communication system 1 according to the embodiment of the invention. The wireless communication system 1 is provided with a multifunction printer (MFP) 10 and a smartphone 20. The smartphone 20 corresponds to "wireless communication device (second wireless communication device)", and the MFP 10 corresponds to "communication device (first wireless communication device), which is to be a communication partner" of the smartphone 20 as the "wireless communication device". A wireless communication by the short distance wireless communication of Near Filed Communication (NFC) and Bluetooth® (hereinafter referred to as "BT") is available between the MFP 10 and the smartphone 20. The communication path between the MFP 10 and the smartphone 20 by the NFC refers to "r1". Also, the communication path between the MFP 10 and the smartphone 20 by the BT refers to "r2".

Further, it is possible that the smartphone 20 and the MFP 10 are wirelessly communicated with each other by the wireless LAN (Wi-Fi) communication through an access point 30. The communication path between the smartphone 20 and the access point 30 by the Wi-Fi is "r3", and the communication path between the access point and the MFP 10 is "r4". Further, the smartphone 20 and the MFP 10 are connected with a network including an internet via an access point 30 and an optical communication network, etc. so as to communicate with the connection server 40. The communication path between the access point 30 and the server 40 is "r5". In addition, the smartphone 20 can communicate with the server 40 via the network including a mobile telephone network, an internet, etc. The communication path including the mobile telephone network between the smartphone 20 and the server 40 is "r6".

The server 40 is a server to provide an electronic mail print service. The server 40 is provided with more than one server computer. The individual identification information is registered in the server 40. An electronic mail address is assigned to the MFP 10, and it is corresponded to the individual identification information of the MFP 10 in the server 40 so that the electronic mail address that was corresponded to the MFP 10 is registered. An electronic mail sent to the electronic mail address assigned in the MFP 10 is received in the server 40, and in the server 40, a body text or an attached file of the electronic mail is converted to print data that is an appropriate format for printing in the MFP 10 so that the print data is sent. The MFP 10 can execute printing based on the print data sent from the server 40. By the way, the configuration sending a print target from the smartphone 20 to the server 40 is not limited to the configuration sending it in the electronic mail so that the print target can be sent other than the method of the electronic mail from the smartphone 20 to the server 40.

Figure 2A:
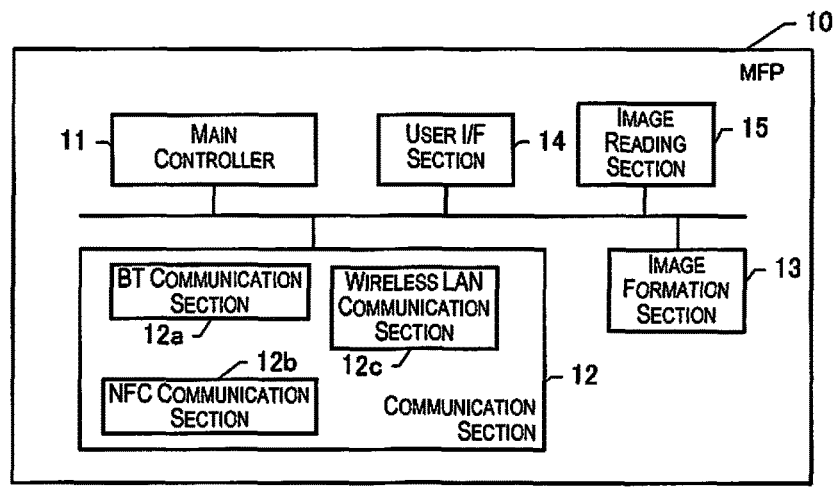
FIG. 2A is a block diagram showing MFP according to the embodiment of the invention.

FIG. 2A is a block diagram showing a configuration of the MFP 10. As shown in FIG. 2A, the MFP 10 is provided with a main controller 11, a communication section 12, an image formation section 13, a user IIF section 14, and an image reading section 15. The main controller 11 is configured by a CPU, a non-volatile memory, a RAM, ASIC, etc., and various programs stored in the non-volatile memory are executed by the CPU so that the MFP 10 can be controlled entirely. Specifically, the main controller 11 performs communication in various methods by controlling the communication section 12. The communication section 12 is provided with a BT communication section 12a to realize a BT communication function, a NFC communication section 12b to realize a NFC communication function, and a wireless LAN communication section 12c to realize a wireless LAN communication function, etc. so that a received signal is converted in accordance with a protocol and it is sent to an internal bus. The signal obtained from the internal bus is converted in accordance with the protocol and it is sent. Also, the communication section 12 can be provided with a wire LAN communication section (not shown in the drawing) to realize a wire LAN communication function, or an interface (not shown in the drawing) to realize widely known other wire communication function.

Further, when the print data is obtained by the communication section 12, the main controller 11 executes printing based on the obtained print data by the image formation section 13. The image formation section 13 is provided with an actuator, a sensor, a drive circuit, and machine components to execute printing on a print medium of a photographic paper, a plain paper, an OHP sheet, etc. by widely known print methods such as an inkjet method, an electrophotographic method, etc. The user I/F section 14 is provided with a touch panel display, an operation key that the user inputs an instruction, etc. The touch panel display guides various information for the user and the user inputs various instructions. Also, the image reading section 15 is provided with a widely known color image sensor, which emits light toward a document placed on a platen and separates the reflected light from the document in each color of RGB for the scan image data, and an actuator, a drive circuit, and machine components to convey the document. The main controller 11 controls the image reading section 15 to read the document placed on the platen, and the obtained scan image data is stored in the non-volatile memory. Then, the main controller 11 controls the communication section 12 to output the scan image data outside.

Figure 2B:
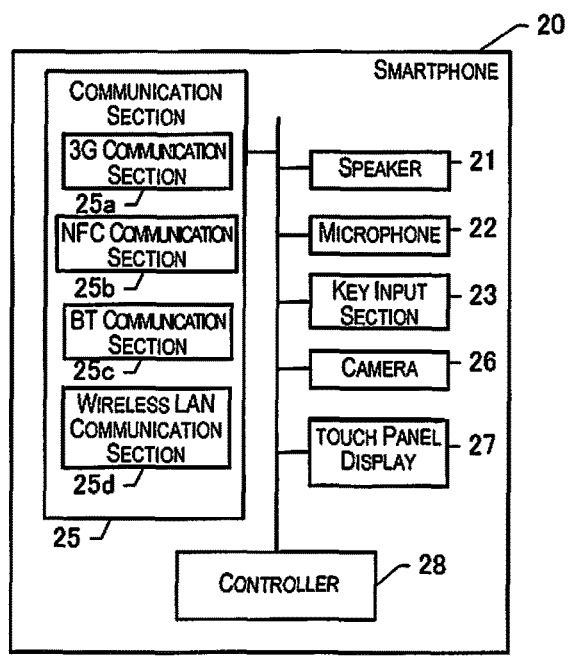
FIG. 2B is a block diagram showing a smartphone according to the embodiment of the invention.

FIG. 2B is a block diagram showing the configuration of the smartphone 20. The smartphone 20 is provided with a controller 28, a speaker 21 to produce voice, a microphone 22 to collect voice, a key input section 23 to input various instructions of the user, a communication section 25, a camera 26, a touch panel display 27, etc. The main controller 28 is configured by a CPU, a RAM, a ROM, a non-volatile memory, etc., and various programs stored in the ROM or the non-volatile memory are executed by the CPU so that each section of the smartphone 20 can be controlled. In the various programs, an application program (hereinafter referred to as APP) to execute printing by using the MFP 10 is included. The APP is a program provided from a vendor of the MFP 10, and it is downloaded or installed from a predetermined server, or it is preliminary installed in the smartphone 20.

The communication section 25 is provided with a 3G communication section 25a to perform a communication by using the mobile telephone network of 3G method, a NFC communication section 25b to perform a communication by the NFC, a BT communication section 25c to perform a communication by the BT, and a wireless LAN communication section 25d to perform a communication by the wireless LAN, etc. so that a received signal is converted in accordance with a protocol and it is sent to an internal bus. The signal obtained from the internal bus is converted in accordance with the protocol and it is sent. The camera 26 is provided with a lens, an area image sensor, and an image processing circuit. An object is taken and the digital image data is produced. The touch panel display 27 guides various information for the user, and various instructions are inputted by the user.

1-2. Communication Path Selection Process

Figure 3:
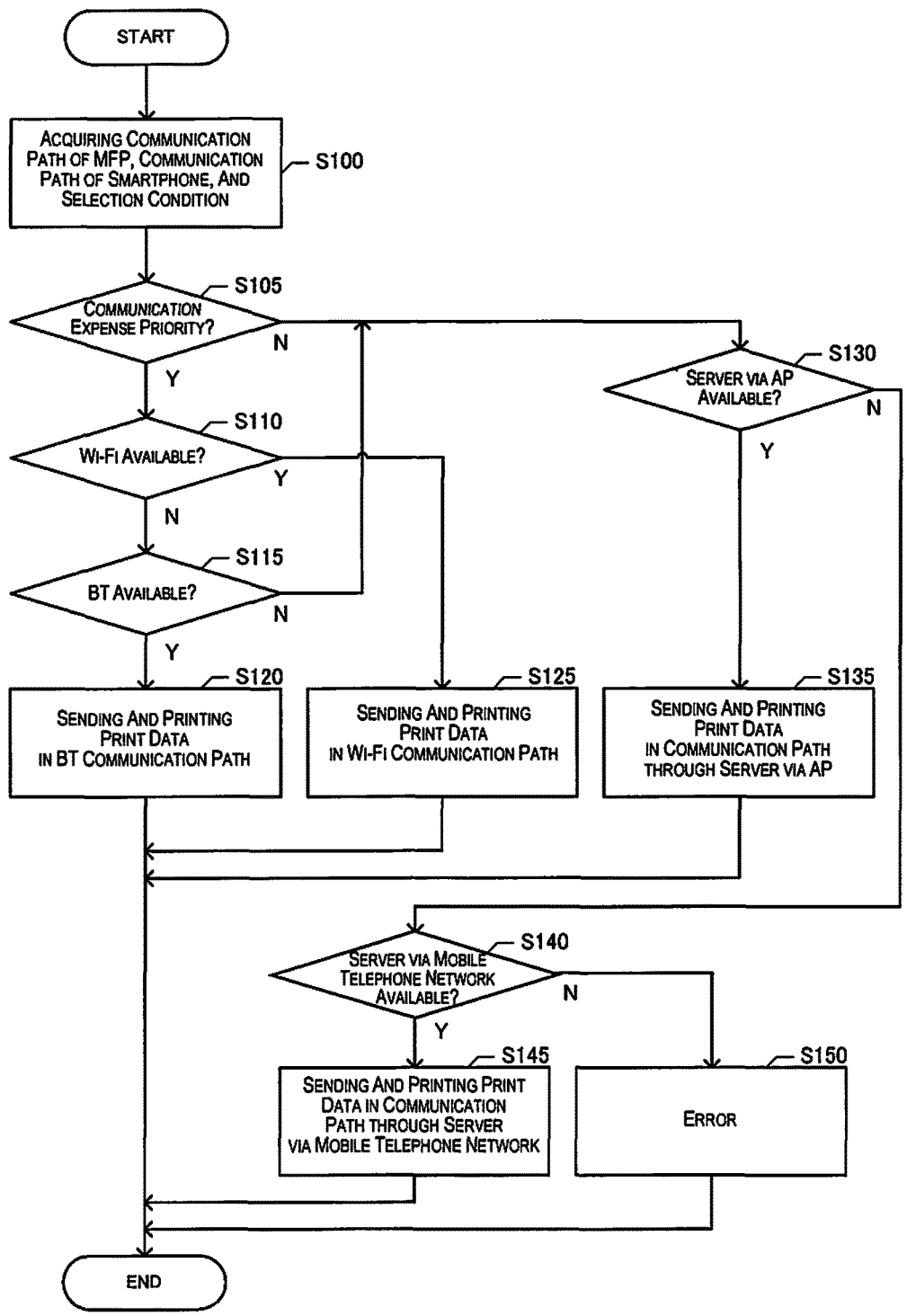
FIG. 3 is a flowchart showing a communication path selection process according to the embodiment of the invention.

FIG. 3 is a flowchart showing that the controller 28 of the smartphone 20 executes a communication path selection process when the user prints an image file stored in the smartphone 20 in the MFP 10. Initially, for example, when the user holds the smartphone 20 over the NFC communication section 12b of the MFP 10 in the state that the user selects an image file to be printed by activating the APP in the smartphone 20, the controller 28 of the smartphone 20 controls the NFC communication section 25b and communicates with the NFC communication section 12b of the MFP 10, and the MFP 10 obtains information (opposite side device communication information (the first communication path information), which indicates an available communication path, from the NFC communication section 12b, and also, information (communication information (second communication path information), which indicates available communication path of the smartphone 20, and information, which indicates a selection condition, are obtained from the inside of the smartphone 20 (Step S100).

In the present embodiment, as the information indicating an available communication path of the MFP 10, it includes the information indicating an available communication in the BT, the information indicating an available wireless LAN communication through the access point 30 as a slave unit of the access point 30, and the information indicating that the MFP 10 has been registered in the server 40 to provide a mail print service and is available in a communication with the server 40 through the internet. When the information indicating the available communication path of the MFP 10 is requested from the smartphone 20 by the NFC, the main controller 11 of the MFP 10 queries to the communication section 12 and an available communication type is obtained from the communication section 12. Also, the main controller 11 obtains a registration status for the server 40, which provides the mail print service, from the non-volatile memory, etc., and when it has been registered, the communication section 12 is controlled to query, for example, whether the connection status with the server 40 is normal. And, the main controller 11 replies the information to the smartphone 20 by the NFC. In this case, the main controller 11 and the communication section 12 of the MFP 10 functions as "the first communication path information transmission means", and the controller 28 and the communication section 25 of the smartphone 20 functions as the "opposite side device communication information acquisition means (the first communication path information acquisition means)".

Further, in the present embodiment, as the information indicating an available communication path of the smartphone 20, it includes the information indicating an available internet connection via the mobile telephone network, the information indicating an available BT communication, and the information indicating an available wireless LAN communication with the MFP 10 through the access point 30 as a slave unit of the access point 30. The controller 28 of the smartphone 20 queries to the communication section 25, and the information indicating a type of an available communication is acquired from the communication section 25. In this case, the controller 28 functions as the "communication information acquisition means (second communication path information acquisition means)".

Further, in the present embodiment, the information indicating a selection condition is defined as a parameter reviewed by the APP, and an initial setting value or a value that the user preliminary selected is stored in the non-volatile memory, etc. of the smartphone 20. Specifically, in the present embodiment, as the initial setting value or the value that the user preliminary selected, either one of a communication expense priority or a service priority is stored. The user preliminary specifies a selection condition so that the smartphone 20 can select the communication path in the selection condition desired by the user. In Step S100, the controller 28 acquires the parameter indicating a selection condition from the non-volatile memory, etc. In this case, the controller 28 functions as "selection condition acquisition means".

FIG. 4 shows four patterns of the communication paths in the case that an image file is sent from the smartphone 20 to the MFP 10 to print the image file, which is stored in the smartphone 20, in the MFP 20. As shown in FIG. 4, the pattern A is a pattern that the image file is sent from the smartphone 20 to the MFP 10 by the BT communication (communication path r2). The pattern B is a pattern that the image file is sent from the smartphone 20 to the MFP 10 through the access point 30 by the wireless LAN communication (Wi-Fi)(communication paths r3 and r4).

The pattern C is a pattern that an electronic mail attached with the image file for a print target is sent from the smartphone 20 to the server 40 through the access point 30 and the internet by the wireless LAN communication (communication paths r3, r5), and the server 40 converts the image data, which includes the attached image file, to the print data in an appropriate format for printing in the MFP 10 and it is sent to the MFP 10 (communication paths r5, r4). The pattern D is a pattern that an electronic mail attached with the image file for a print target is sent from the smartphone 20 to the server 40 through the mobile telephone network and the internet (communication path r6), and the server 40 converts the image data, which includes the attached image file, to the print data in an appropriate format for printing in the MFP 10 and it is sent to the MFP 10 (communication paths r5, r4).

Here, the patterns A to D are compared in view of the communication expense. It is considered that the pattern A and the pattern B do not normally require the communication expense. The pattern C can require the expense for using the internet, and the pattern D can also require the expense for using the mobile telephone network. Also, in the present embodiment, generally, the communication expense for using the mobile telephone network can be more expensive than the communication expense for using the optical communication network. Therefore, the communication expenses are shown in the order of lower expenses in FIG. 4 so that a smaller value in the patterns indicates lower communication expense.

Further, when the patterns A to D are compared in view of the easiness of service addition, the pattern C and the pattern D in which the server 40 performs a rendering processing of the image file for a print target is better than the pattern A and the pattern B that do not use the server 40 because when the server 40 is not used, either one of the smartphone 20 or the MFP 10 has to perform the rendering processing, but the processing ability of the smartphone 20 and the MFP 10 is generally lower in comparison with the processing ability of the server 40 so that it takes longer processing time than the server 40 and the electric consumption can increase in the case of the smartphone 20. Also, to perform the rendering processing corresponding to various file formats, and to add an image processing service other than the rendering, the size of the stored program is increased so that the cost can be increased. Because of this, in view of the easiness of the service addition, the pattern C and the pattern D is better than the pattern A and the pattern B. In the order according to ease of the service addition in FIG. 4, a smaller value in the patterns indicates easier service addition.

Further, when the patterns A to D are compared in view of the processing time related to the communication, normally, in the order of shorter processing time related to the communication of FIG. 4, the smaller value in the patterns is considered as that the processing time related to the communication is short. By the way, regarding the pattern C or the pattern D, in addition to the communication time, the processing time related to the communication includes the processing time in the server 40. Summarizing the above, in the case of the present embodiment, when the communication expense priority is selected as the selection condition, the pattern A or the pattern B is selected. By the way, in the present embodiment, the condition to select one of these two patterns is the processing time related to the communication. That is, when both patterns are available, the shorter processing time related to the communication is selected. Also, when the service priority is selected, the pattern C or the pattern D is selected. In the same manner, the condition to select one of these patterns is the processing time related to the communication, and when the both patterns are available, the shorter processing time related to the communication is selected. It returns to the description of the flowchart in FIG. 3.

Next, the controller 28 determines whether or not the selection condition is the communication expense priority (Step S105), and when it is the communication expense priority, it determines whether or not the wireless LAN communication by Wi-Fi for the MFP 10 is available (Step S110). In Step S110, when it determines that the wireless LAN communication by Wi-Fi for the MFP 10 is available, the controller 28 selects the Wi-Fi communication path (that is, the pattern B), and the image file for a print target is sent to the MFP 10 in the communication path and the printing is executed (Step S125). That is, the path using Wi-Fi that is faster than the communication speed of the BT (communication time is shorter than BT) is preferentially selected.

When it determines that the wireless communication by Wi-Fi for the MFP 10 is not available in Step S110, the controller 28 determines whether or not the BT communication for the MFP 10 is available (Step S115). When it determines that the BT communication is available for the MFP 10 in Step S115, the controller 28 selects the BT communication path (that is, the pattern A), and the image file for a print target is sent to the MFP 10 by connecting to the MFP 10 in the BT and the printing is executed (Step S120).

When the communication expense priority is not selected in Step S105 (that is, the service priority is selected as the selection condition in the case of the present embodiment), or when it determines that the BT communication is not available in Step S115, the controller 28 determines whether or not the server 40 communicating through the access point 30 is available (Step S130). When it determines that the server 40 communicating through access point 30 is available in Step S130, the controller 28 selects the communication path (that is, the pattern C) through the server 40 via the access point 30 and the image file of a print target is sent in the communication path, and the printing is executed in the MFP 10 (Step S135).

Specifically, in Step S135, first, the controller 28 of the smartphone 20 requests an electronic mail address assigned to the MFP 10 from the MFP 10 in the NFC, and the main controller 11 of the MFP 10 sends the electronic mail address assigned own to the smartphone 20 in the NFC. Then, the controller 28 of the smartphone 20 attaches an image file for a print target to the electronic mail addressed to the obtained electronic mail address of the MFP 10, and it is sent by using the Wi-Fi wireless LAN communication. As a result, the server 40 receives the electronic mail and the print data, which was generated by rendering processing the image data including the attached file, is sent and the MFP 10 controls the image formation section 13 based on the sent print data and the printing is executed.

When it determines that the server 40 communicating through the access point 30 is not available in Step S130, the controller 28 determines whether or not the server 40 communicating through the mobile telephone network is available (Step S140). When it determines that the server 40 communicating through the mobile telephone network is available in Step S140, the controller 28 selects the communication path (that is, pattern D) through the server 40 via the mobile telephone network, and an image file for a print target is sent in the communication path and the printing is executed (Step S145). Specifically, the smartphone 20 acquires the electronic mail address of the MFP 10 from the MFP 10 in the NFC in the same manner as Step S135. And, the controller 28 of the smartphone 20 attaches an image file for a print target in an electronic mail of the acquired electronic mail address and the electronic mail is sent by using the mobile telephone network. As a result, the server 40 receives the electronic mail and the print data, which was generated by rendering processing the image data including the attached file, is sent to the MFP 10 and the MFP 10 controls the image formation section 13 based on the sent print data and the printing is executed.

When it determines that the server 40 communicating through the mobile telephone network is not available in Step S140, the error is notified (Step S150). Specifically, for example, it is notified that the image file for a print target cannot be sent to the MFP 10 in the wireless communication. By the way, when the controller 28 executes Steps S105 to 5150, the controller 28 functions as "selection means", and the controller 28 and the communication section 25 function as "communication means". Because of this, according to the present embodiment, when a plurality of communication paths are existed between the smartphone 20 and the MFP 10, a communication can be performed by automatically selecting an appropriate communication path in accordance with the selection condition so that this is advantage for the user.

2. Other Embodiments

Also, in the technical scope of the invention, it is not limited to the aforementioned embodiment, and various modifications can be made in a scope not substantially deviating from the subject matter of the invention. For example, in the aforementioned embodiment, the example that the smartphone 20 acquires the information related to the communication path from the MFP 10 and it compares with the information related to the communication path of the own device and the communication path is selected in accordance with the selection condition was described. However, the MFP 10 can acquires the information related to the communication path from the smartphone 20 and it compares with the information related to the communication path of the own device (MFP 10) and the communication path can be selected in accordance with the selection condition. And, the selection result can be notified in either one of the two wireless communication devices. That is, the communication path selection process shown in FIG. 3 can be executed in either one of the two wireless communication devices (one of the smartphone 20 and the MFP 10 is the first wireless communication device and the other one is the second wireless communication device so that each device can be equivalent to any one of them).

By the way, in the aforementioned embodiment, the example that it queries to the MFP 10 in the NFC whether or not the MFP 10 is compatible with the mail print service (it is registered in the server 40) was described, but it is just an example so that it is not limited to this aspect. For example, it can be an aspect that in Step S100, the individual identification information of the MFP 10 is acquired, and the smartphone 20 queries the server 40 whether or not the MFP 10 corresponding to the individual identification information has been registered in the server 40 so that it can determine whether or not the MFP 10 is compatible with the mail print service.

Further, in the aforementioned embodiment, the path selection in the case that a file for a print target stored in the smartphone 20 is printed in the MFP 10 was described. However, for example, the path selection in the case that the scan data read in the MFP 10 transfers to the smartphone 20 can be applied. Also, for example, the path selection in the case that a file stored in the smartphone 20 transfers to a projector and it is projected by the project can be applied.

Further, as the information for selecting a communication path, the different information (e.g., attribute information indicating an attribution of a print target, or an attribute information of the wireless communication device, which is to be a communication partner), which is other than the information related to an available communication path between two wireless communication devices, is acquired from the wireless communication device of the communication partner (in this case, the controller 28 and the communication section 25 function as "attribute information acquisition means"), and the path selection can be further performed based on the attribute information. For example, a communication path can be selected based on the attribute information of a print target file which indicates whether a file for a print target stored in the smartphone 20 includes photographic image data or includes only text or figure data, etc. When the file includes the photographic image data, it considers that the print quality can be improved if the rendering processing or other image processing is performed in the server 40 so that the communication path, which communicates through the server 40, can be preferentially selected.

Further, for example, when the scan image data read in the MFP 10 is sent to the wireless communication device of the communication partner, the read resolution is adjusted in response to the attribution of the wireless communication device such as the resolution of the display of the opposite side wireless communication device, the size of the memory, etc., and further, a communication path can be selected in response to the size of the scan image data. Also, a communication path can be selected in response to the attribution of the scan image data. For example, when it determines that the scan image data is a photograph, a communication path, which communicates through the server, can be selected to use an image processing performed by the server for external image processing, and when it determines that the scan image data is text, a communication path, which does not communicate through the server, can be selected.

Further, when a file stored in the smartphone 20 is sent to and printed in the MFP 10, and when it is sent to and projected in the projector, a communication path can be selected in response to the attribution of the opposite side wireless communication device such as the ability of the image formation section 13 of the MFP 10, the resolution of the projector, etc. For example, when the resolution of the projector is lower than the predetermined standard, it is not necessary to perform the rendering processing or the image processing for the file to be high quality so that a communication path, which does not communicate through the server executing various image processing, can be selected. When the resolution of the projector is high, a communication path, which communicates through the server having high processing ability of image processing to produce high quality image, can be selected.

By the way, the types of the communication paths between the two wireless communication devices described in the aforementioned embodiments are an example so that other various paths can be existed. For example, a communication path in the Wi-Fi Direct can be existed between the smartphone 20 and the MFP 10. Also, as a communication path, at least a part of the path can be the wireless communication. For example, the communication between the smartphone 20 and the MFP 10 can be performed such that the smartphone 20 and the server 40 are communicated by the wireless communication, and the MFP 10 and the access point 30 are communicated by the wire communication. Also, in the aforementioned embodiments, when the information indicating a communication path used in the wireless communication device of the communication partner is obtained, the example that it is communicated by the NFC was described, but also, it is just an example so that, for example, a short distance wireless communication such as TransferJet (registered trademark) can be employed.

To attain the aforementioned advantage, a wireless communication device is the wireless communication device that performs a communication with a communication device wirelessly, and it includes an opposite side device communication information acquisition means, a communication information acquisition means, a selection means, and a communication means. The opposite side device communication information acquisition means acquires opposite side device communication information indicating a communication path of a wireless communication used in the communication device by a short distance wireless communication. Here, the opposite side device communication information can be information in any configuration as long as the information can identify a communication path that can be available for the communication device, which is to be a communication partner. In the opposite side device communication information can include information that identifies a wire communication path so that the communication device can use it not only for the wireless communication. The communication information acquisition means acquires communication information indicating a communication path of a wireless communication in itself. Here, the communication information can be any information as long as the information can identify a communication path that the own device can use. In the communication information, it can include information that identifies a wire communication path so that the own device can use it not only for the wireless communication. The selection means selects a communication path, which is used for a communication with the communication device, among a plurality of communication paths based on the opposite side device communication information and the communication information. The communication means performs a communication between the communication devices by the selected communication path.

The wireless communication device of the invention includes the aforementioned means so that when a plurality of communication paths are existed to communicate with the communication device which is to be a communication partner, an appropriate communication path can be automatically selected based on the communication path used in the communication device and the communication path used in the wireless communication device so that the communication can be performed.

Further, the wireless communication device to attain the aforementioned advantage includes a selection condition acquisition means that acquires a selection condition to select a communication path used for a communication with the communication device, and in this case, the selection means selects a communication path to communicate with the communication device in accordance with the selection condition. Here, the relative merits can be determined by comparing between the plurality of communication paths in the points of view such as a communication expense, a processing time related to the communication, and various other points. In other words, the selection condition means to select which point of view should be prioritized among the various points. In this case, the communication path used for a communication between the communication devices can be selected in accordance with a predetermined selection condition and based on the communication path used in the communication device and the communication path used in the wireless communication device.

Further, the wireless communication device to attain the aforementioned advantage includes an attribute information acquisition means that acquires attribute information, which indicates an attribution of a print target, from the communication device in a short distance wireless communication. In this case, the selection means selects the communication path to communicate with the communication device based on the attribute information. Here, as the attribute information that indicates a print target, for example, the types of print target data, the data size, etc. can be expected. In this case, more appropriate communication path can be selected based on the attribute information of a print target, which is different from the information identifying an available communication path.

Further, the wireless communication device to attain the aforementioned advantage includes an attribute information acquisition means that acquires attribute information, which indicates an attribution of the communication device, in the short distance wireless communication. In this case, the selection means selects a communication path to communicate with the communication device based on the attribute information. Here, as the attribute information that indicates an attribution of the communication device, for example, the information related to the processing ability of the communication device, etc. can be expected. In this case, more appropriate communication path can be selected based on the attribute information of the communication device, which is different from the information identifying an available communication path.

Further, in the wireless communication device to attain the aforementioned advantage, the selection condition acquisition means can acquire a selection condition specified by the user. In this case, the user's desire can be reflected in the selection of the communication path.

Further, as described above, the opposite side device communication information that indicates the communication path of the wireless communication used in the communication device, which is to be a communication partner, is acquired from the communication device in short distance wireless communication, and the communication information that indicates the communication path of the wireless communication used in the own communication device is acquired. Therefore, a communication path used for the communication is selected from among the plurality of communication paths based on the opposite side device communication information and the communication information, and the communication is performed by the selected communication path between the communication devices. This method is realized in the invention of the wireless communication method, the wireless communication device control program, and the wireless communication system. Also, the aforementioned system, device, program, and method can be realized in a single device or can be realized in a common part of a multifunction device so that it includes various aspects.

Further, a wireless communication system has a first wireless communication device and a second wireless communication device and performs a communication between the first wireless communication device and the second wireless communication device. The first wireless communication device has a first communication path information transmitting means that transmits first communication path information, which indicates a communication path of a wireless communication in own device, to the second wireless communication device in a short distance wireless communication. The second wireless communication device has a first communication path information acquisition means that acquires the first communication path information from the first wireless communication device in the short distance wireless communication, and a second communication path acquisition means that acquires the second communication path information, which indicates a communication path of a wireless communication in own device. The system further has a selection means selecting a communication path used for a communication with the first wireless communication device among a plurality of communication paths based on the first communication path information and the second communication path information, and a communication means performing a communication with the first wireless communication device in the selected communication path.

What is claimed is:

1. A wireless communication device performing a communication with a communication device wirelessly, comprising:
   a communication information acquisition unit that acquires a communication information from the communication device using a short distance wireless communication, the communication information indicating a plurality of communication paths available to the communication device and other than the short distance wireless communication;
   a selection unit that selects one of a plurality of communication paths other than the short distance wireless communication based on the communication information; and
   a communication unit that performs a communication with the communication device in the selected one of the plurality of communication paths;
   wherein the selection unit selects one communication path available to both the wireless communication device and the communication device according to a predetermined information indicative of priority criteria for selecting a communication path.

2. The wireless communication device according to claim 1, further comprising:
   a selection condition acquisition unit that acquires the predetermined information for selecting the one of the plurality of communication paths used in the communication with the communication device;
   wherein the selection unit selects the one of the plurality of communication paths communicating with the communication device in accordance with the predetermined information;
   wherein the selection condition acquisition unit acquires the predetermined information specified by a user.

3. The wireless communication device according to claim 1, further comprising:
   an attribute information acquisition unit that acquires attribute information, which indicates an attribution of a print target, from the communication device in the short distance wireless communication;
   wherein the selection unit selects the one of the plurality of communication paths communicating with the communication device based on the attribute information.

4. The wireless communication device according to claim 1, further comprising:
   an attribute information acquisition unit that acquires attribute information, which indicates an attribution of the communication device, from the communication device in the short distance wireless communication;
   wherein the selection unit selects the one of the plurality of communication path communicating with the communication device based on the attribute information.

5. The wireless communication device according to claim 1,
   the plurality of communication paths includes at least two of a Wi-Fi communication, a Wi-Fi Direct communication, a Bluetooth communication and a communication using mobile telephone network.

6. A non-transitory computer readable medium recording a wireless communication device control program executed in a wireless communication device to perform a wireless communication with a communication device comprising:
- a communication information acquisition function that acquires a communication information from the communication device using a short distance wireless communication, the communication information indicating a plurality of communication paths available to the communication device and other than the short distance wireless communication;
- a selection function that selects one of a plurality of communication paths other than the short distance wireless communication based on the communication information; and
- a communication function that performs a communication with the communication device in the selected one of the plurality of communication paths;
- wherein the selection function selects one communication path available to both the wireless communication device and the communication device according to a predetermined information indicative of priority criteria for selecting a communication path.

7. A wireless communication system having a first wireless communication device and a second wireless communication device and performing a communication between the first wireless communication device and the second wireless communication device,
the first wireless communication device having
- a communication path information transmitting unit that transmits a communication path information to the second wireless communication device using a short distance wireless communication, the communication path information indicating a plurality of wireless communication paths available to the first wireless communication device and other than the short distance wireless communication;

the second wireless communication device having
- a communication information acquisition unit that acquires a communication information from the communication device using a short distance wireless communication, the communication information indicating a plurality of communication paths available to the communication device and other than the short distance wireless communication;
- a selection unit that selects one of a plurality of communication paths other than the short distance wireless communication based on the communication information; and
- a communication unit that performs a communication with the communication device in the selected one of the plurality of communication paths;
- wherein the selection unit selects one communication path available to both the first wireless communication device and the second wireless communication device according to a predetermined information indicative of priority criteria for selecting a communication path.

* * * * *